United States Patent
Zhang et al.

(10) Patent No.: US 12,235,193 B1
(45) Date of Patent: Feb. 25, 2025

(54) PHYSICAL TEST SYSTEMS OF LARGE-SCALE THREE-DIMENSIONAL MULTI-FUNCTIONAL LANDSLIDE-PREVENTION AND CONTROL STRUCTURE

(71) Applicants: RAILWAY ENGINEERING RESEARCH INSTITUTE, CHINA ACADEMY OF RAILWAY SCIENCES CO., LTD., Beijing (CN); CHINA ACADEMY OF RAILWAY SCIENCES CO., LTD., Beijing (CN)

(72) Inventors: Yufang Zhang, Beijing (CN); Jian Li, Beijing (CN); Kun Yuan, Beijing (CN); Zhenhua Yin, Beijing (CN); Zheyuan Xing, Beijing (CN); Wenjiao Zhou, Beijing (CN); Mengjia Liu, Beijing (CN); Zhongmin Yang, Beijing (CN); Guozhuang Song, Beijing (CN); Xu Gao, Beijing (CN); Jiawei Fan, Beijing (CN); Jian Cui, Beijing (CN); Bo Liu, Beijing (CN); Yunni Yang, Beijing (CN)

(73) Assignees: RAILWAY ENGINEERING RESEARCH INSTITUTE, CHINA ACADEMY OF RAILWAY SCIENCES CO., LTD., Beijing (CN); CHINA ACADEMY OF RAILWAY SCIENCES CO., LTD., Beijing (CN)

( * ) Notice: Subject to any disclaimer, the term of this patent is extended or adjusted under 35 U.S.C. 154(b) by 0 days.

(21) Appl. No.: 18/824,869

(22) Filed: Sep. 4, 2024

(51) Int. Cl.
*G01M 99/00* (2011.01)

(52) U.S. Cl.
CPC ........ *G01M 99/005* (2013.01); *G01M 99/007* (2013.01)

(58) Field of Classification Search
CPC ... G01M 99/00; G01M 99/005; G01M 99/007
See application file for complete search history.

(56) References Cited

U.S. PATENT DOCUMENTS

| | | | |
|---|---|---|---|
| 11,965,738 B1* | 4/2024 | Qiu | G01C 15/00 |
| 2007/0052951 A1* | 3/2007 | Van Cranenbroeck | G01C 15/002 356/139.02 |

(Continued)

FOREIGN PATENT DOCUMENTS

| CN | 210665280 U | 6/2020 |
|---|---|---|
| CN | 217484323 U | 9/2022 |

(Continued)

OTHER PUBLICATIONS

First Office Action in Chinese Application No. 202410390402.0 mailed on May 7, 2024, 11 pages.

(Continued)

*Primary Examiner* — Eric S. McCall
(74) *Attorney, Agent, or Firm* — Porus IP LLC (57) ABSTRACT

Embodiments of the present disclosure provide a physical test system of large-scale three-dimensional multi-functional landslide-prevention and control structure. The system comprises a model test tank, a bidirectional servo loading system, a multi-scale model transformation system, a sliding surface evolution visualization system, a positive pressure monitoring system, an artificial rainfall system, and a control system. The bidirectional servo loading system applies a horizontal load and a vertical load, and the multi-scale model transformation system includes a plurality of retractable counterforce brackets, configured to change a width of the model test tank; and the sliding surface evolution visualization system includes a plurality of filming (Continued)

devices, configured to record a whole evolution process of a landslide sliding surface evolution.

10 Claims, 4 Drawing Sheets

(56) References Cited

U.S. PATENT DOCUMENTS

| | | | | |
|---|---|---|---|---|
| 2012/0229623 A1* | 9/2012 | Hsieh | ............ | G01V 11/00 |
| | | | | 348/135 |
| 2014/0227036 A1* | 8/2014 | Jeong | ............ | G09B 23/40 |
| | | | | 405/79 |
| 2014/0322689 A1* | 10/2014 | Choi | ............ | G09B 23/40 |
| | | | | 434/276 |
| 2021/0324596 A1* | 10/2021 | Li | ............ | E02D 17/202 |
| 2022/0066058 A1* | 3/2022 | Gan | ............ | G01V 1/01 |
| 2022/0365234 A1* | 11/2022 | Zhang | ............ | G01S 17/86 |
| 2023/0046111 A1* | 2/2023 | Ramesh | ............ | G01V 1/181 |
| 2023/0228567 A1* | 7/2023 | Qiu | ............ | G01C 11/02 |
| | | | | 348/144 |
| 2023/0410626 A1* | 12/2023 | Qiu | ............ | G01S 19/42 |
| 2024/0011825 A1* | 1/2024 | Song | ............ | G01H 9/006 |
| 2024/0068809 A1* | 2/2024 | Zhang | ............ | G01C 15/00 |
| 2024/0105083 A1* | 3/2024 | Lan | ............ | G09B 25/04 |

FOREIGN PATENT DOCUMENTS

| | | |
|---|---|---|
| CN | 116908415 A | 10/2023 |
| JP | 2020012362 A | 1/2020 |

OTHER PUBLICATIONS

Decision to Grant a Patent in Chinese Application No. 202410390402.0 mailed on May 15, 2024, 3 pages.

* cited by examiner

PHYSICAL TEST SYSTEMS OF LARGE-SCALE THREE-DIMENSIONAL MULTI-FUNCTIONAL LANDSLIDE-PREVENTION AND CONTROL STRUCTURE

CROSS-REFERENCE TO RELATED APPLICATIONS

The present disclosure claims priority to Chinese patent application No. 202410390402.0, filed on Apr. 2, 2024, the entire contents of which are incorporated herein by reference.

TECHNICAL FIELD

The present disclosure relates to a technology field of a geotechnical engineering test, and in particular, to a physical test system of large-scale three-dimensional multi-functional landslide-prevention and control structure.

BACKGROUND

A landslide is a natural phenomenon in which soil or rock on a slope, influenced by factors such as river erosion, groundwater activity, rainwater infiltration, earthquakes, or man-made slope cutting, slides downhill under the force of gravity along a weak surface or zone. Landslides cause significant damage to human life, property safety, and the environment. Landslides are characterized by complex conditions of formation, numerous influencing factors, and diverse movement mechanisms, making the study of landslide mechanisms and prevention technologies particularly challenging. In the field of geotechnical engineering, physical modeling experiments are commonly used to study the process of landslide disasters and the effectiveness of prevention and control measures. These experimental research methods are of great significance for understanding and preventing landslides.

However, the existing test equipment of a landslide physical model is usually small in scale, with a single model size and a single function, which fails to satisfy the simulation of landslides at different scales and the simulation of the function of the landslide-prevention and control structures, and thus brings certain difficulties to the landslide research. Aiming at the above problems, a physical test system of large-scale three-dimensional multi-functional landslide-prevention and control structure is proposed to realize the simulation of large-scale landslides, multi-scale landslide tests, as well as the simulation of landslides under multiple working conditions, such as rainfall, heap loads, excavation, structural prevention and control measures, so as to analyze and study the evolution process of landslides and the effectiveness of the landslide control structure.

SUMMARY

Some embodiments of the present disclosure provide a physical test system of large-scale three-dimensional multi-functional landslide-prevention and control structure, comprising:

a model test tank, the model test tank including a first tank wall and a second tank wall that are arranged relatively to each other, a front tank wall and a rear tank wall that are arranged relatively to each other, and a through hole, the through hole being disposed on the front tank wall. The front tank wall may be connected with a front end of the first tank wall and the second tank wall, and the rear tank wall may be connected with a rear end of the first tank wall and the second tank wall;

a bidirectional servo loading system, the bidirectional servo loading system including a horizontal loading module and a vertical loading module. The horizontal loading module may be disposed on the rear tank wall and configured to apply a horizontal load to a test soil body piled up inside the model test tank, and the vertical loading module may be located above the model test tank and configured to apply a vertical load to the test soil body;

a multi-scale model transformation system, configured to change a width of the model test tank. The multi-scale model transformation system includes a plurality of retractable counterforce brackets. A width of each of the retractable counterforce brackets may be constant and a side of each of the retractable counterforce brackets may abut against an inner inside of the first tank wall of the model test tank. The plurality of the retractable counterforce brackets may be disposed side by side, and the retractable counterforce bracket may be retractable and extendable along a length direction of the model test tank and be removable out of the model test tank through the through hole;

a sliding surface evolution visualization system, configured to record a whole evolution process of a landslide sliding surface evolution. The sliding surface evolution visualization system may include a wall frame and a plurality of filming devices, the plurality of the filming devices being mounted in the wall frame in a matrix form. The wall frame may be disposed in the model test tank along the length direction of the model test tank and an outer side of the wall frame may be supported by an inner side of the retractable counterforce bracket;

a positive pressure monitoring system, configured to collect lateral pressure subjected by the test soil body during a test. The positive pressure monitoring system may include a plurality of monitoring devices, the plurality of the monitoring devices being arranged in a matrix form and disposed on an inner side of the second tank wall;

an artificial rainfall system, the artificial rainfall system being a rainfall device provided above the model test tank for simulating natural rainfall of different intensities; and a control system, configured to control the bidirectional servo loading system, the multi-scale model transformation system, the sliding surface evolution visualization system, the positive pressure monitoring system, and the artificial rainfall system, and configured to monitor, collect, process, analyze, and display test data.

In some embodiments, each of the retractable counterforce brackets may include a bracket head, a bracket tail, and a cross-link assembly. Two ends of the cross-link assembly may be hinged to the bracket head and the bracket tail. Wheels and fixation pins may be mounted on a bottom of the bracket head. The wheels may be provided at bottoms of both the bracket tail and the cross-link assembly. A motor may be provided inside the bracket tail to control the cross-link assembly to extend and retract by driving the bracket tail to move.

In some embodiments, the cross-link assembly may include 2 to 6 cross rows, and two horizontally adjacent cross rows may be connected by a crossbar. The crossbar may be either a hinged shaft of the cross row or a non-hinged point sets vertically on the cross row.

In some embodiments, a width of the retractable counterforce bracket is in a range of 1 m to 2 m.

In some embodiments, an inner side of the wall frame may be provided with a transparent panel. The outer side of the wall frame may directly contact the retractable counterforce bracket. When the retractable counterforce bracket is not disposed, the wall frame may directly contact the first tank wall.

In some embodiments, the positive pressure monitoring system may include a reserved hole provided in the second tank wall, and the reserved hole may be configured to accommodate the monitoring device. A head end of the monitoring device may be provided with a steel plate. A polyester plate may be provided on a side of the steel plate back to the monitoring device.

In some embodiments, the horizontal loading module may include one or more horizontal loading cylinders and one or more horizontal pushing plates. The one or more horizontal loading cylinders may be fixed vertically on the rear tank wall. The one or more horizontal pushing plates may be disposed at an output end of the horizontal loading cylinder. The one or more horizontal pushing plates may be fixed at a front end of each of the one or more horizontal loading cylinders, and the horizontal pushing plate may act directly on the test soil body. The horizontal pushing plate may be square and arranged in a matrix form, and a sealing band may be used to connect two adjacent horizontal pushing plates.

In some embodiments, widths of all of the retractable counterforce brackets may be the same. A width of the horizontal pushing plate and the width of the retractable counterforce bracket may be the same.

In some embodiments, the width of the model test tank may be 17 m, a total width of the sliding surface evolution visualization system may be 1 m, and the width of the horizontal pushing plate and the width of the retractable counterforce bracket may be 2 m, enabling an effective space of the model test tank to be changed in units of 2 m.

In some embodiments, the vertical loading module may include a vertical counterforce bracket, a row of vertical loading cylinders, and a vertical pushing plate. The vertical counterforce bracket may span above the model test tank. The vertical loading cylinder may be set vertically on the vertical counterforce bracket. The vertical pushing plate may be fixed at an output end of the vertical loading cylinder. The vertical loading cylinder may exert vertical pressure on the test soil body by driving the vertical pushing plate to move along a vertical direction to prevent the test soil body from bulging up when being pushed horizontally. Top surfaces of two side walls of the model test tank may be provided with a horizontal track, and the vertical counterforce bracket may move along the horizontal track.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, where.

Numbers in the figures denote: 1-model test tank; 2-lateral wall; 3-rear tank wall; 4-horizontal loading cylinder; 5-horizontal pushing plate; 6-vertical loading cylinder; 7-vertical pushing plate; 8-vertical counterforce bracket; 9-horizontal track; 10-retractable counterforce bracket; 101-bracket head; 102-cross-link assembly; 103-bracket tail; 104-fixation pin; 111-wall frame; 112-grid; 113-sealing plate; 12-positive pressure monitoring system; 121-reserved hole; 122-pre-embedded pipe; 123-monitoring device; 124-sensor line; 125-steel plate; 126-polyester plate; 13-rainfall device; 14-water supply device; 15-oil supply device; 16-control console; 17-vertical sealing band; 18-horizontal sealing band.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

In the description of the present disclosure, the terms "vertical," "horizontal", "up", "down", "front", "back", "left", "right", "top", "bottom", or the like indicate an orientation or positional relationship based on the orientation or positional relationship shown in the accompanying drawings and are intended only to facilitate the description of the present disclosure rather than to require that the present disclosure must be constructed and operated in a particular orientation, and therefore are not to be construed as a limitation of the present disclosure. The terms "connected" and "connection" as used herein are to be understood broadly, for example, as a fixed connection or a removable connection, a direct connection or an indirect connection through an intermediate component, and the specific meaning of the above terms may understand by a person of ordinary skill in the art.

The present disclosure will be described in detail hereinafter with reference to the accompanying drawings and together with embodiments. It should be noted that the embodiments and features in the present disclosure may be combined with each other without conflict.

Figure 1:
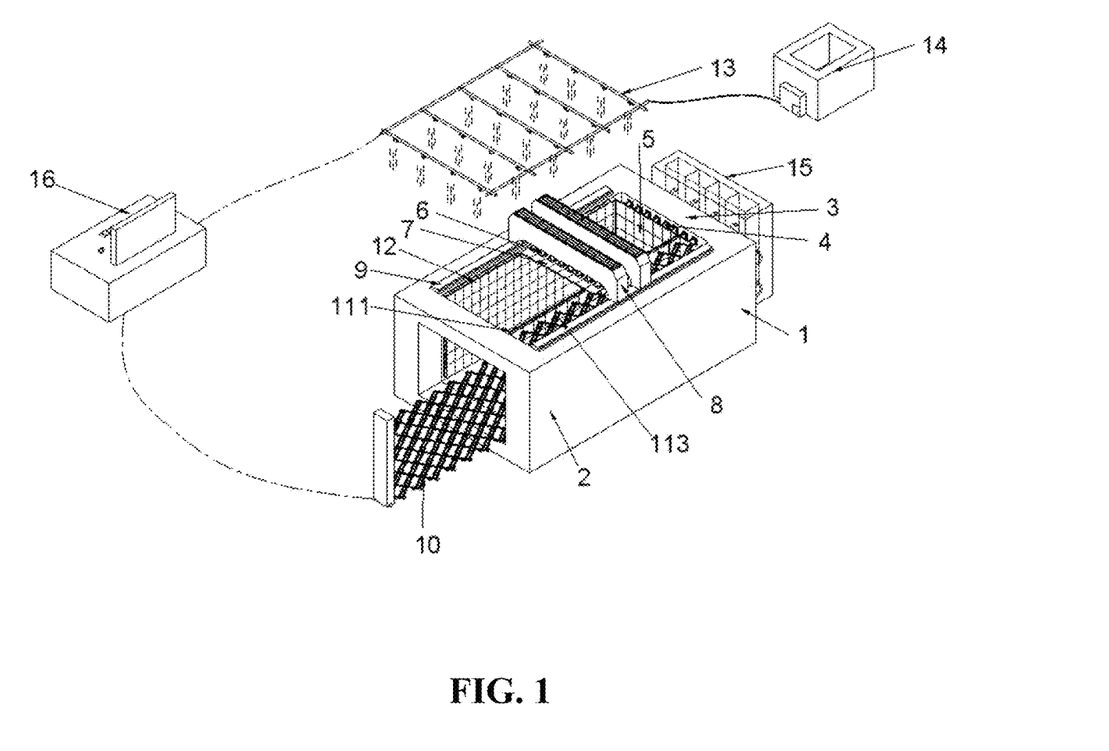
FIG. 1 is a schematic diagram illustrating an exemplary structure of a physical test system of large-scale three-dimensional multi-functional landslide-prevention and control structure according to some embodiments of the present disclosure.

FIG. 1 is a schematic diagram illustrating an exemplary structure of a physical test system of large-scale three-dimensional multi-functional landslide-prevention and control structure according to some embodiments of the present disclosure.

As shown in FIG. 1, in some embodiments, the physical test system of large-scale three-dimensional multi-functional landslide-prevention and control structure includes a model test tank 1, a bidirectional servo loading system, a multi-scale model transformation system, a sliding surface evolution visualization system, a positive pressure monitoring system 12, an artificial rainfall system, and a control system.

In some embodiments, the model test tank 1 may be a tank structure made of reinforced concrete. The model test tank 1 may be a body structure for a landslide model test. A test soil body of landslide may be stacked in the model test tank 1 during the test.

In some embodiments, the model test tank 1 may include a first tank wall and a second tank wall that are arranged relatively to each other, and a front tank wall and a rear tank wall 3 that are arranged relatively to each other. The front tank wall may be connected with a front end of the first tank wall and the second tank wall. The rear tank wall 3 may be connected with a rear end of the first tank wall and the second tank wall. A through hole may be disposed on the front tank wall. The first tank wall and the second tank wall may provide lateral restraint to the test soil body within the model test tank 1. The rear tank wall 3 may provide counterforce support for the bidirectional servo loading system as the bidirectional servo loading system applies a horizontal force to the model test tank 1.

The second tank wall and the first tank wall may both be inner side surfaces of the lateral wall 2.

The lateral wall 2 may include walls where the first tank wall and the second tank wall are located.

In some embodiments, the bidirectional servo loading system may include a horizontal loading module and a vertical loading module. The horizontal loading module may be disposed on the rear tank wall 3. The horizontal loading module may be configured to apply a horizontal load to the test soil body to simulate a landslide thrust. The vertical loading module may be located above the model test tank 1. The vertical loading module may be configured to apply a vertical load to the test soil body to prevent the test soil body from bulging up when the test soil body is subjected to the horizontal load.

In some embodiments, the multi-scale model transformation system may be configured to change a width of the model test tank 1. The multi-scale model transformation system may include a plurality of retractable counterforce brackets 10. A width of each of the retractable counterforce brackets 10 may be constant and a side of each of the retractable counterforce brackets may abut against an inner side of the first tank wall of the model test tank 1. The plurality of the retractable counterforce brackets 10 may be disposed side by side. The retractable counterforce bracket 10 may be retractable and extendable along a length direction of the model test tank and may be removable out of the model test tank 1 through the through hole on the front tank wall. The width of the model test tank 1 may be changed by shrinking or elongating different counts of the retractable counterforce bracket 10 along the length direction of the model test tank 1. The description of how the retractable counterforce bracket 10 may change the width of the model test tank 1 can be found in FIG. 3.

In some embodiments, the sliding surface evolution visualization system may be configured to record a whole evolution process of a landslide sliding surface evolution. The sliding surface evolution visualization system may include a grid-like wall frame 111 and a plurality of filming devices. A plurality of grids 112 may be provided on the wall frame 111 uniformly. The plurality of filming devices may be mounted in the wall frame 111 in a matrix form. The filming device may observe the evolution process of the landslide sliding surface via the grid 112. The wall frame 111 may be disposed inside the model test tank 1 along the length direction of the model test tank 1 and an outer side of the wall frame 111 may be supported by an inner side of the retractable counterforce bracket 10. A side of the sliding surface evolution visualization system that is back from the filming device may be configured to constrain the test soil body during the test.

The positive pressure monitoring system 12 may be configured to collect lateral pressure subjected by the test soil body during the test. The positive pressure monitoring system 12 may be located opposite the sliding surface evolution visualization system. The positive pressure monitoring system may collect the lateral pressure subjected by the test soil body during the test in real-time via a monitoring device 123.

In some embodiments, the positive pressure monitoring system 12 may include a plurality of monitoring devices 123. The plurality of monitoring devices 123 may be arranged in a matrix form and disposed on an inner side of the second tank wall. The monitoring device 123 may include an earth pressure monitor. The earth pressure monitor may include a point pressure sensor.

The artificial rainfall system may be configured to simulate natural rainfall of different intensities. The artificial rainfall system may be installed at a top position of a test site.

In some embodiments, the artificial rainfall system may include a rainfall device 13 disposed above the model test tank 1 and a water supply device 14 configured to supply water to the rainfall device 13. The water supply device 14 may include a water tank and a water pump. The water tank may be arranged on the ground in the vicinity of the model test tank 1. The water may be stored in the water tank and then pumped out of the water tank by the water pump to be supplied to the artificial rainfall system. The ground in the vicinity may be a ground region with a preset radius range centered on the model test tank 1. The preset radius range may be predetermined by experience for those skilled in the art.

The control system may be configured to control the bidirectional servo loading system, the multi-scale model transformation system, the sliding surface evolution visualization system, the positive pressure monitoring system 12, and the artificial rainfall system, and configured to monitor, collect, process, analyze, and display test data.

The control system may control the horizontal loading module on the bidirectional servo loading system to apply the horizontal load to the test soil body piled up inside the model test tank and/or control the vertical loading module to apply the vertical load to the test soil body.

The control system may also control the retractable counterforce bracket on the multi-scale model transformation system to change the width of the model test tank.

The control system may also control the sliding surface evolution visualization system to record the whole evolution process of the landslide sliding surface evolution and upload filming data obtained by the filming device to the control system.

The control system may also control the positive pressure monitoring system to collect the lateral pressure subjected by the test soil body during the test and upload data of the lateral pressure monitored by the control system.

The control system may also control the artificial rainfall system to simulate the natural rainfall of different intensities.

The control system may control any one of the bidirectional servo loading system, the multi-scale model transformation system, the sliding surface evolution visualization system, the positive pressure monitoring system, and the artificial rainfall system either individually or any number of systems simultaneously to collect monitoring data such as stress, strain, displacement, water content, water pressure, etc., laid in the test soil body, process collected monitoring data, and finally display processed monitoring data in different forms such as charts.

According to some embodiments of the present disclosure, the physical test system of large-scale three-dimensional multi-functional landslide-prevention and control structure may simulate a catastrophic process of landslides of different scales under multiple working conditions, such as rainfall, stacking, excavation, etc., investigate the evolution process of the landslide sliding surface evolution and the effectiveness of different control structures on landslides, which provides experimental conditions for the research of landslide disaster mechanisms and control measures.

Figure 3:
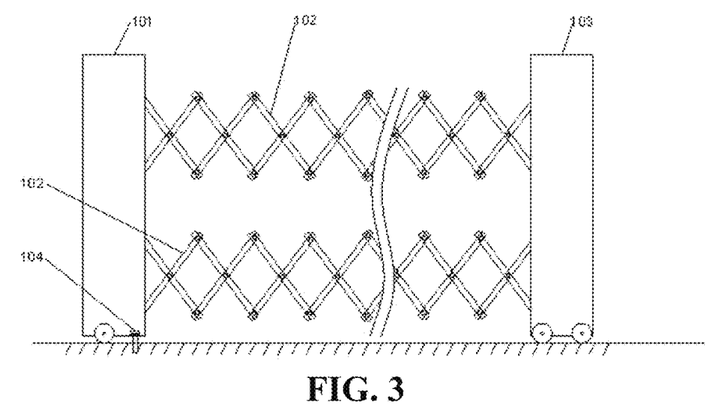
FIG. 3 is a schematic diagram illustrating an exemplary structure of a retractable counterforce bracket according to some embodiments of the present disclosure.

FIG. 3 is a schematic diagram illustrating an exemplary structure of a retractable counterforce bracket according to some embodiments of the present disclosure.

As shown in FIG. 3, the retractable counterforce bracket 10 may include a bracket head 101, a bracket tail 103, and a cross-link assembly 102.

Two ends of the cross-link assembly 102 may be hinged to the bracket head 101 and the bracket tail 103.

A wheel and a fixation pin 104 may be mounted on a bottom of the bracket head 101.

The wheels may be provided at bottoms of both the bracket tail 103 and the cross-link assembly 102. A motor may be provided inside the bracket tail 103 to control the cross-link assembly 102 to extend and retract by driving the bracket tail to move.

When in use, the retractable counterforce bracket 10 may be pushed to a position outside the model test tank 1 directly opposite a through hole, and then the fixation pin 104 may be inserted into the ground to fix the position of the bracket head 101. Then, the motor inside the bracket tail 103 may be turned on, causing the bracket tail 103 to enter an interior of the model test tank 1 and reach a position where the rear tank wall 3 is located. The retractable counterforce bracket 10 may operate similarly to a crossover motorized retractable door in the prior art.

The model test tank 1 may be provided with a plurality of retractable counterforce brackets 10 correspondingly, and bracket heads 101 of the plurality of retractable counterforce brackets 10 may be arranged outside the model test tank 1 along the width direction of the model test tank in sequence. Two adjacent retractable counterforce brackets 10 may be connected with each other for support or separated from each other, preferably in a separation manner. For each additional retractable counterforce bracket 10 in an unfolded and elongated state, the width of the model test tank 1 may be reduced by a corresponding size, realizing a multi-scale transformation of the model test tank 1. A plurality of cross-link assemblies 102 between the bracket head 101 and the bracket tail 103 may be provided along a vertical direction of the bracket head 101 or the bracket tail 103.

According to some embodiments of the present disclosure, the retractable counterforce bracket of the above structure may automatically control the width of the model test tank.

As shown in FIG. 1, the retractable counterforce bracket 10 located on an outermost side of the model test tank 1 may abut against an inner side of the first tank wall and be configured to transfer a restriction force of the lateral wall 2 on the test soil body inside the model test tank 1. The retractable counterforce bracket 10 located at an innermost side of the model test tank 1 may support a sliding surface evolution visualization system. The sliding surface evolution visualization system may directly contact the test soil body.

In some embodiments, as shown in FIG. 1, the cross-link assembly 102 may include 2 to 6 cross rows, with two horizontally adjacent cross rows connected by a crossbar. The cross row may be a plurality of X-shaped structures formed by two equally long rods crossing each other.

The crossbar may either be a hinged shaft arranged on the cross row or a non-hinged point set vertically on the cross row. The crossbar may fix a spacing between two horizontally adjacent cross rows, enhancing the stability of the cross rows. When a plurality of retractable counterforce brackets 10 are disposed side by side, the plurality of retractable counterforce brackets 10 may support each other, and the crossbar can prevent the retractable counterforce brackets 10 from deforming along a horizontal direction and maintain a spacing between two horizontally adjacent cross rows, which stably supports the sliding surface evolution visualization system. As in FIG. 3, two sets of cross-link assembly may be used, and the two sets of the cross-link assembly may include a set of the cross-link assembly disposed above the retractable counterforce bracket 10 and a set of the cross-link assembly disposed below the retractable counterforce bracket 10. Each set of the cross-link assembly may include a plurality of cross rows arranged side-by-side and the crossbar may be disposed at a non-hinged position between two horizontally adjacent cross rows.

According to some embodiments of the present disclosure, by connecting two horizontally adjacent cross rows on the cross-link assembly through the crossbar, the crossbar can prevent the retractable counterforce bracket 10 from distorting horizontally and maintain the spacing between the two horizontally adjacent cross rows, which stably supports the sliding surface evolution visualization system.

In some embodiments, a width of the retractable counterforce bracket 10 may be in a range of 1 m to 2 m, as shown in FIG. 1.

According to some embodiments of the present disclosure, by setting the width of the retractable counterforce bracket 10 in a range of 1 m to 2 m, the sliding surface evolution visualization system can be more stably supported.

Figure 2:
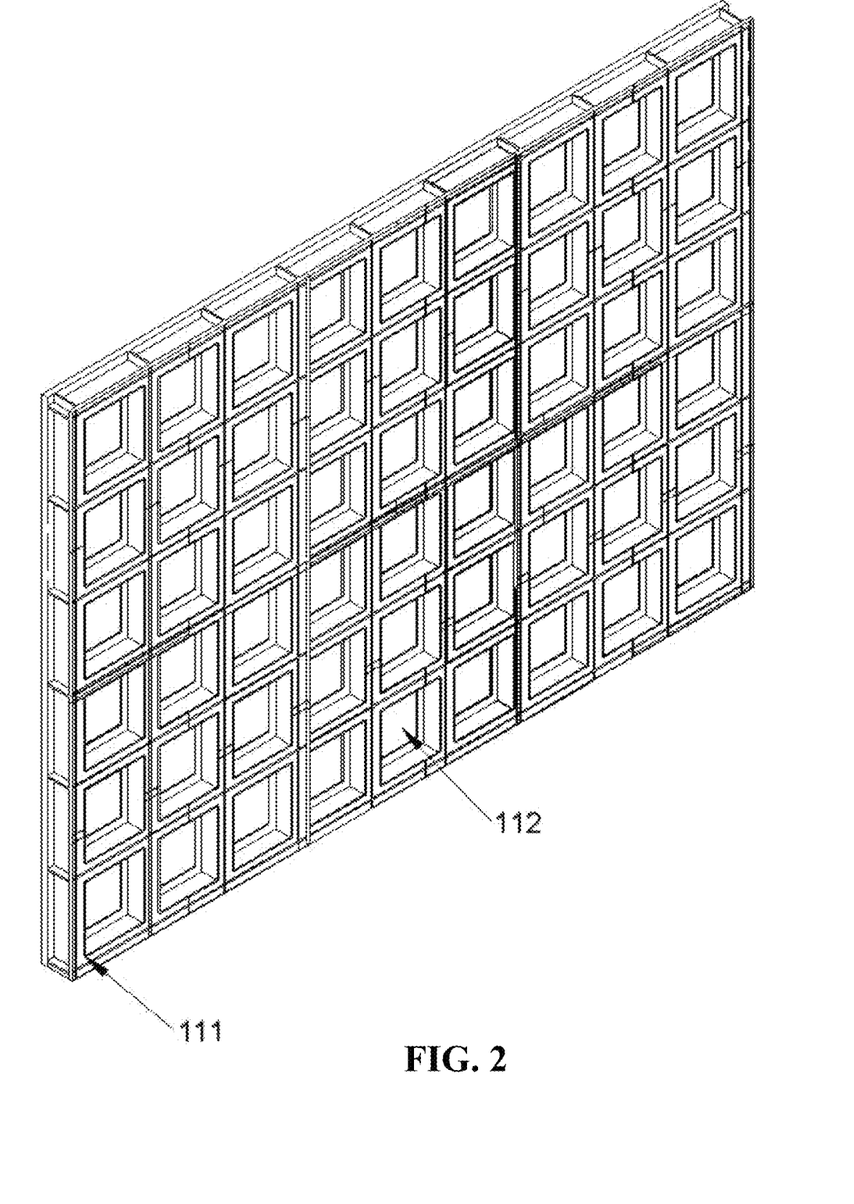
FIG. 2 is a schematic diagram illustrating an exemplary structure of a wall frame according to some embodiments of the present disclosure.

FIG. 2 is a schematic diagram illustrating an exemplary structure of a wall frame according to some embodiments of the present disclosure.

In some embodiments, a transparent panel may be provided on an inner side of the wall frame 111, as shown in FIG. 2. The transparent panel may be a tempered glass or Plexiglas panel.

A sealing plate 113 may be provided on an outer side of the wall frame 111. The sealing plate 113 may protect a filming device from the outside. The sealing plate 113 or the wall frame 111 may contact an inner side of the retractable counterforce bracket 10. A width of an effective space of the model test tank 1 may be adjusted by using different counts of the retractable counterforce bracket 10 to support a sliding surface evolution visualization system. For each additional retractable counterforce bracket 10, the width of the effective space of the model test tank 1 may be reduced by a corresponding size.

When the retractable counterforce bracket 10 is not disposed, the wall frame 111 may directly contact a first tank wall.

Figure 4:
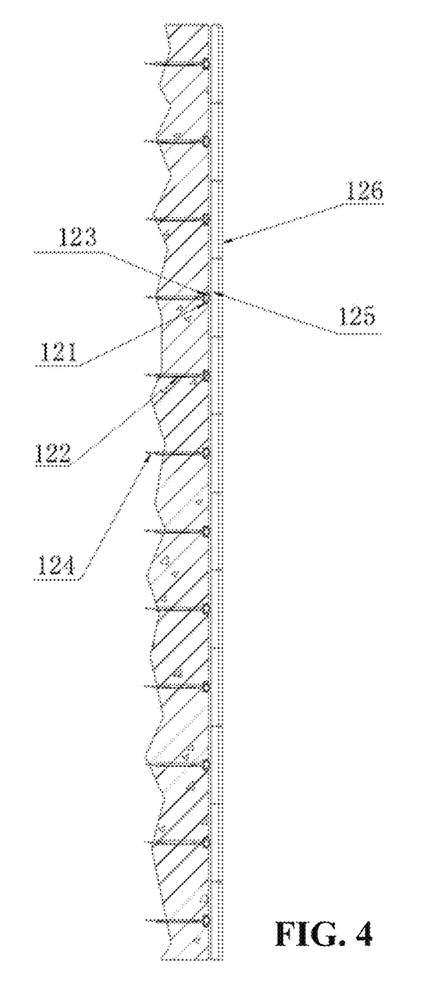
FIG. 4 is a schematic diagram illustrating a monitoring device of a positive pressure monitoring system according to some embodiments of the present disclosure.
Figure 5:
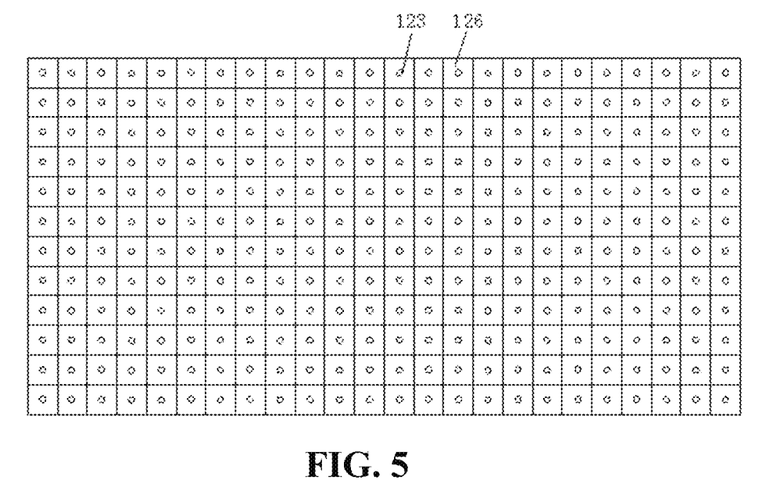
FIG. 5 is a schematic diagram illustrating an arrangement of a polyester plate of the positive pressure monitoring system according to some embodiments of the present disclosure.

FIG. 4 is a schematic diagram illustrtaing a monitoring device of a positive pressure monitoring system according to some embodiments of the present disclosure. FIG. 5 is a schematic diagram illustrating an arrangement of a polyester plate of a positive pressure monitoring system according to some embodiments of the present disclosure.

In some embodiments, the positive pressure monitoring system 12 may further include a reserved hole 121 and a pre-embedded pipe 122 installed on a second tank wall, as shown in FIG. 4 and FIG. 5.

The monitoring device 123 may be placed inside the reserved hole 121, and a sensor line 124 of the monitoring device 123 may be led through the pre-embedded pipe 122 out of the second tank wall. A steel plate 125 may be mounted at a head end of the monitoring device 123. A polyester plate 126 may be provided on a side of the steel plate 125 back to the monitoring device 123. The polyester plate 126 may be a rigid plate and may directly contact a test soil body, reducing a friction between the test soil body and the positive pressure monitoring system 12 during a test. The steel plate 125 and the polyester plate 126 may be square plates of the same size. The monitoring device 123 may be an earth pressure monitor and the earth pressure monitor may be a point pressure sensor. A center point of the steel plate 125 may be taken as an installation position of the monitoring device 123, and a value of the pressure applied to the center point of the steel plate 125 may be considered as an average value of the pressure applied to the steel plate 125.

In some embodiments, as shown in FIG. 1, a horizontal loading module may include a first counterforce frame, one or more plurality of horizontal loading cylinders 4, and one or more plurality of horizontal pushing plates 5. The one or more horizontal loading cylinders 4 may be fixed vertically to the rear tank wall 3. The one or more horizontal pushing plates 5 may be disposed at an output end of the one or more horizontal loading cylinders 4. The one or more horizontal pushing plates 5 may be fixed at a front end of each of the one or more horizontal loading cylinders 4. The one or more horizontal pushing plates 5 may directly act on the test soil body. The one or more horizontal loading cylinders 4 may receive a power through an oil supply device 15. The one or more horizontal loading cylinders 4 may transmit a force to the test soil body by pushing the one or more horizontal pushing plates 5. The one or more horizontal pushing plates 5 may be square and arranged in a matrix form, enabling a count of the horizontal loading cylinder 4 to be adjusted according to a design dimension of the test soil body. A sealing band may be used to connect adjacent horizontal pushing plates 5.

Figure 6:
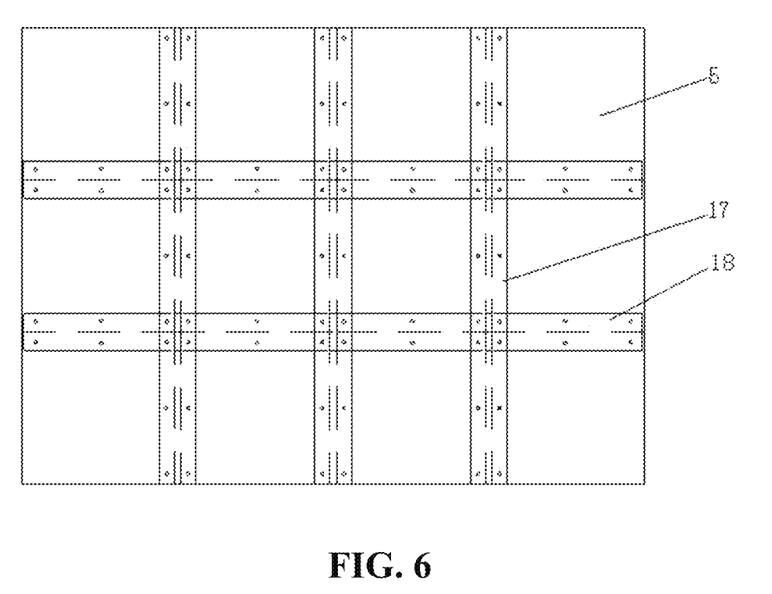
FIG. 6 is a schematic diagram illustrating a sealing band according to some embodiments of the present disclosure.

FIG. 6 is a schematic diagram illustrating installation of a sealing band according to some embodiments of the present disclosure.

As shown in FIG. 6, vertical side seams of the horizontal pushing plates 5 may be sealed with a vertical sealing band 17, and horizontal side seams of the horizontal pushing plates 5 may be sealed with a horizontal sealing band 18, to prevent soil from leaking between two horizontal pushing plates 5. The sealing band may be a non-marking tape or an elastic rubber sheet, or the like. The non-marking tape may be applied directly to the vertical side seams or the horizontal side seams. A resilient rubber sheet may be mounted on the horizontal pushing plate 5 by means of a bolted thread. Adjacent horizontal pushing plates 5 may be released by unsealing a sealing band between the plates when an effective size of the model test tank 1 is changed.

For example, when a test soil body is piled up to a height of only three rows of the horizontal pushing plates 5, and at this time, a sealing band connected between a third row of the horizontal pushing plates 5 and a fourth row of the horizontal pushing plates 5 may be unlocked, i.e., only several rows of the horizontal pushing plates 5 of a height comparable to a height of the test soil body may be needed in order to push the test soil body.

As another example, if the test soil body requires only a width of 10 rows of the horizontal pushing plates 5, the horizontal sealing band 18 connected between a tenth row of the horizontal pushing plates 5 and an eleventh row of the horizontal pushing plates 5 may need to be unlocked while a width of the model test tank 1 is changed using the retractable counterforce bracket 10.

As shown in FIG. 6, an installation situation may be shown when an elastic rubber sheet is used as the sealing band. If the non-marking tape is used, when dividing a non-moving horizontal pushing plate 5 from a moving horizontal pushing plate, two adjacent horizontal pushing plates 5 may be untied by directly scratching the non-marking tape with a knife.

In some embodiments, as shown in FIG. 1, a vertical loading module includes a vertical counterforce bracket 8, a row of vertical loading cylinders 6, and a vertical pushing plate 7. The vertical counterforce bracket 8 may span above the model test tank 1. The row of vertical loading cylinders 6 may disposed vertically on the vertical counterforce bracket 8. The vertical pushing plate 7 may be fixed at an output end of the vertical loading cylinder 6.

The vertical loading cylinder 6 may drive the vertical pushing plate 7 along a vertical direction. The vertical pushing plate 7 may directly act on the test soil body to provide vertical pressure on the test soil body, preventing the test soil body from bulging up when being pushed horizontally. Top surfaces of a first tank wall and a second tank wall of the model test tank 1 are provided with a horizontal track 9, respectively, and the vertical counterforce bracket 8 may move along the horizontal track 9, thereby adjusting an action region of vertical loading. The vertical pushing plate 7 may be rectangular. Both the horizontal loading module and the vertical loading module may be provided with the oil supply device 15. The oil supply device 15 powers the horizontal loading cylinder 4 and the vertical loading cylinder 6.

In some embodiments, there may be a plurality of retractable counterforce brackets 10, and each of the plurality of retractable counterforce brackets 10 may be of the same width. Widths of the horizontal pushing plate 5 and the vertical pushing plate 7 may be the same as that of the retractable counterforce bracket 10. When a count of the retractable counterforce bracket 10 is changed, it may be ensured that the horizontal pushing plate 5 or the vertical pushing plate 7 at an edge may reach as far as possible to a boundary of an effective space of the model test tank 1. For example, a control system may adjust a specific count of working vertical loading cylinders 6 and horizontal loading cylinders 4, so that a total width of loading cylinders may be consistent with the width of the effective space of the model test tank 1.

In some embodiments, the width of the model test tank 1 may be 17 m, a total width of a sliding surface evolution visualization system may be 1 m, and both the width of the horizontal pushing plate 5 and the width of the retractable counterforce bracket 10 may be 2 m, enabling the effective space of the model test tank to be changed in units of 2 m.

Assuming that 6 retractable counterforce brackets 10 may be set up in a supporting manner, the width of the effective space of the model test tank 1 may be reduced by 2 m, 4 m, 6 m, 8 m, 10 m, and 12 m. When all of the retractable counterforce brackets 10 are contracted, i.e., when the retractable counterforce bracket 10 is not disposed, the width of the effective space of the model test tank 1 may be 16 m, i.e., a width of a test tank may change in a range of 4 m to 16 m in the present specific embodiment.

Two vertical counterforce brackets 8 may be dispoed, and eight vertical loading cylinders 6 may be mounted on each of the vertical counterforce brackets 8, and length and width dimensions of the vertical pushing plate 7 of each of the vertical loading cylinders 6 may be 3 m×2 m, and a total area of sixteen vertical loading cylinders 6 may be 6 m×16 m.

During horizontal loading, the test soil body located in front of the horizontal pushing plate 5 may be rumbled and damaged, and at this time, by observing and operating the vertical counterforce bracket 8 through a control console 16 to slide to a position where the test soil body is rumbled, and then controlling the vertical loading cylinder 6 to extend to restrain a top portion of the test soil body.

The present disclosure is different compared to the conventional action of vertical loading force, a total area of required vertical pushing plate 7 is smaller, and it is only necessary to load the vertical pushing plate 7 to a certain range of the test soil body in front of the horizontal pushing plate 5.

In some embodiments, functions of the control system may include functions for controlling a plurality of loading cylinders, functions for controlling the retractable counterforce bracket 10, functions for controlling monitoring of a sliding surface evolution visualization system, functions for controlling monitoring of a positive pressure monitoring system, functions for controlling an artificial rainfall system, and functions for controlling a guide rail, or the like.

The control system may be integrated into the control console 16. The control system may carry out individual control of different functions or multifunctional control simultaneously, collect monitoring data such as stress, strain, displacement, water content, water pressure, etc., which are laid in the test soil body, process collected monitoring data, and ultimately diversify processed monitoring data in different forms such as charts and graphs.

The function for controlling a plurality of loading cylinders may be specifically to implement a linkage loading mode of a single horizontal loading cylinder 4 and a single vertical loading cylinder 6, whether they are used individually, in a single row/column, or in multiple cylinders, and to control a magnitude of a loading force and a loading rate of the plurality of loading cylinders.

The function for controlling a guide rail may be specifically to control a position of the vertical counterforce bracket 8 on the horizontal track 9 of the model test tank 1, and thereby to control a loading position of the vertical loading module.

The function for controlling the retractable counterforce bracket 10 may be specifically to control a count of the retractable counterforce bracket 10 to extend and contract the retractable counterforce bracket 10, thereby changing a width of the model test tank 1 and carrying out landslide tests at different scales.

The function for controlling a sliding surface evolution visualization system may be specifically to control a filming device on a visualization wall device to film and record the impact of a test process of the test soil body inside the model test tank, and display a whole evolution process of a landslide sliding surface evolution after filming records are combined and processed.

The function for controlling a positive pressure monitoring system may be specifically to monitor lateral pressure applied to a main body in the model test tank 1, to obtain the lateral pressure subjected by the test soil body during a test in real-time, and to calculate a magnitude of a total lateral friction during the landslide.

The function for controlling an artificial rainfall system may be specifically to control a rainfall area, a rainfall intensity, and a raindrop size, and to simulate a catastrophic process of landslides under a rainfall condition.

In summary, a physical test system of large-scale three-dimensional multi-functional landslide-prevention and control structure provided by the present disclosure can simulate a catastrophic process of landslides at different scales under different working conditions such as rainfall, heap loads, and excavation, and explore an evolution process of a landslide sliding surface evolution and the effectiveness of different prevention structures on the landslides, which provides experimental equipment for the research of landslide disaster mechanism and prevention measures.

The basic concepts have been described above, and it is apparent to those skilled in the art that the foregoing detailed disclosure is intended as an example only and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe the present disclosure's embodiments. For example, "an embodiment", "one embodiment", and/or "some embodiments" means a feature, structure, or characteristic associated with at least one embodiment of the present disclosure. Accordingly, it should be emphasized and noted that "an embodiment" or "one embodiment" or "an alternative embodiment" in different places in the present disclosure do not necessarily refer to the same embodiment. In addition, certain features, structures, or characteristics in one or more embodiments of the present disclosure may be suitably combined.

Additionally, unless expressly stated in the claims, the order of the processing elements and sequences, the use of numerical letters, or the use of other names as described in the present disclosure are not intended to qualify the order of the processes and methods of the present disclosure. While some embodiments of the present disclosure that are presently considered useful are discussed in the foregoing disclosure by way of various examples, it is to be understood that such detail serves only an illustrative purpose, and the additional claims are not limited to the disclosed embodiments. Rather, the claims are intended to cover all amendments and equivalent combinations that are consistent with the substance and scope of the embodiments of the present disclosure.

Similarly, it should be noted that in order to simplify the presentation of the disclosure of the present disclosure, and thereby aid in the understanding of one or more of the present disclosure's embodiments, the foregoing descriptions of embodiments of the present disclosure sometimes combine a variety of features into a single embodiment, accompanying drawings, or description thereof.

Some embodiments use numbers to describe the number of components, attributes, and it should be understood that such numbers used in the description of the embodiments are modified in some examples by the modifiers "about", "approximately", or "substantially". Unless otherwise noted, the terms "about", "approximately", or "substantially" indicate that a ±20% variation in the stated number is allowed. Correspondingly, in some embodiments, the numerical parameters used in the present disclosure and claims are approximations, which may change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., are hereby incorporated by reference in their entirety into the present disclosure. Application history documents that are inconsistent with or conflict with the contents of the present disclosure are excluded, as are documents (currently or hereafter appended to the present disclosure) that limit the broadest scope of the claims of the present disclosure. It should be noted that to the extent that there is an inconsistency or conflict between the descriptions, definitions, and/or use of terms in the materials appurtenant to the present disclosure and those set forth herein, the descriptions, definitions and/or use of terms in the present disclosure shall control.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A physical test system of large-scale three-dimensional multi-functional landslide-prevention and control structure, comprising:
   a model test tank, wherein the model test tank includes a first tank wall and a second tank wall that are arranged relatively to each other, and a front tank wall and a rear tank wall that are arranged relatively to each other; a through hole is disposed on the front tank wall; the front tank wall is connected with a front end of the first tank wall and the second tank wall; and the rear tank wall is connected with a rear end of the first tank wall and the second tank wall;
   a bidirectional servo loading system, wherein the bidirectional servo loading system includes a horizontal loading module and a vertical loading module; the horizontal loading module being disposed on the rear tank wall and configured to apply a horizontal load to a test soil body piled up inside the model test tank; and the vertical loading module being located above the model test tank and configured to apply a vertical load to the test soil body;
   a multi-scale model transformation system, configured to change a width of the model test tank, wherein the multi-scale model transformation system includes a plurality of retractable counterforce brackets; a width of the retractable counterforce brackets being constant and a side of the retractable counterforce brackets abutting against an inner inside of the first tank wall of the model test tank; the plurality of the retractable counterforce brackets being disposed side by side; and the retractable counterforce bracket being retractable and extendable along a length direction of the model test tank and being removable out of the model test tank through the through hole;
   a sliding surface evolution visualization system, configured to record a whole evolution process of a landslide sliding surface evolution, wherein the sliding surface evolution visualization system includes a wall frame and a plurality of filming devices, the plurality of the filming devices being mounted in the wall frame in a matrix form, the wall frame is disposed in the model test tank along the length direction of the model test tank and an outer side of the wall frame is supported by an inner side of the retractable counterforce bracket;
   a positive pressure monitoring system, configured to collect lateral pressure subjected by the test soil body during a test, wherein the sliding surface evolution visualization system includes a plurality of monitoring devices, the plurality of the monitoring devices being arranged in a matrix form and disposed on an inner side of the second tank wall;
   an artificial rainfall system, wherein the artificial rainfall system is a rainfall device provided above the model test tank for simulating natural rainfall of different intensities; and
   a control system, configured to control the bidirectional servo loading system, the multi-scale model transformation system, the landslide sliding surface visualization system, the positive pressure monitoring system, and the artificial rainfall system, and configured to monitor, collect, process, analyze, and display test data.

2. The system of claim 1, wherein the width of the retractable counterforce brackets is in a range of 1 m to 2 m.

3. The system of claim 1, wherein an inner side of the wall frame is provided with a transparent panel, and the outer side of the wall frame directly contacts the retractable counterforce bracket, and when the retractable counterforce bracket is not disposed, the wall frame directly contacts the first tank wall.

4. The system of claim 1, wherein the positive pressure monitoring system includes a reserved hole provided in the second tank wall, the reserved hole accommodates the monitoring device, a head end of the monitoring device is provided with a steel plate, and a polyester plate is provided on a side of the steel plate back to the monitoring device.

5. The system of claim 1, wherein the vertical loading module includes a vertical counterforce bracket, a row of vertical loading cylinders, and a vertical pushing plate; the vertical counterforce bracket spans above the model test tank; the vertical loading cylinder is set vertically on the vertical counterforce bracket; the vertical pushing plate is fixed at an output end of the vertical loading cylinder; the vertical loading cylinder exerts vertical pressure on the test soil body by driving the vertical pushing plate to move along a vertical direction to prevent the test soil body from bulging up when being pushed horizontally; top surfaces of two side walls of the model test tank are provided with a horizontal track, and the vertical counterforce bracket moves along the horizontal track.

6. The system of claim 1, wherein
each of the retractable counterforce brackets includes a bracket head, a bracket tail, and a cross-link assembly;
two ends of the cross-link assembly are hinged to the bracket head and the bracket tail;
wheels and fixation pins are mounted on a bottom of the bracket head;
wheels are provided at bottoms of both the bracket tail and the cross-link assembly, and a motor is provided inside the bracket tail to control the cross-link assembly to extend and retract by driving the bracket tail to move.

7. The system of claim 6, wherein the cross-link assembly includes 2 to 6 cross rows, and two horizontally adjacent cross rows are connected by a crossbar.

8. The system of claim 1, wherein
the horizontal loading module includes one or more horizontal loading cylinders and one or more horizontal pushing plates, the one or more the horizontal loading cylinders are fixed vertically on the rear tank wall, the one or more horizontal pushing plates are disposed at an output end of the one or more horizontal loading cylinders, and the one or more horizontal pushing plates are fixed at a front end of each of the one or more horizontal loading cylinders, the one or more horizontal pushing plates act directly on the test soil body; the one or more horizontal pushing plates are square and are arranged in a matrix form, and a sealing band is used to connect two adjacent horizontal pushing plates.

9. The system of claim 8, wherein widths of all of the retractable counterforce brackets are the same, and a width of the horizontal pushing plate and the width of the retractable counterforce bracket are the same.

10. The system of claim 9, wherein the width of the model test tank is 17 m, a total width of the sliding surface evolution visualization system is 1 m; and the width of the horizontal pushing plate and the width of the retractable counterforce bracket are 2 m, enabling an effective space of the model test tank to be changed in units of 2 m.

* * * * *

UNITED STATES PATENT AND TRADEMARK OFFICE
CERTIFICATE OF CORRECTION

Page 1 of 1

PATENT NO. : 12,235,193 B1
APPLICATION NO. : 18/824869
DATED : February 25, 2025
INVENTOR(S) : Yufang Zhang et al.

It is certified that error appears in the above-identified patent and that said Letters Patent is hereby corrected as shown below:

On the Title Page

Foreign Application Priority Data (item (30)), add after item (22) and before item (51):
-- April 2, 2024 (CN) ................ 202410390402.0 --

Signed and Sealed this
Twenty-fifth Day of November, 2025

John A. Squires
*Director of the United States Patent and Trademark Office*